United States Patent Office 3,537,762
Patented Nov. 3, 1970

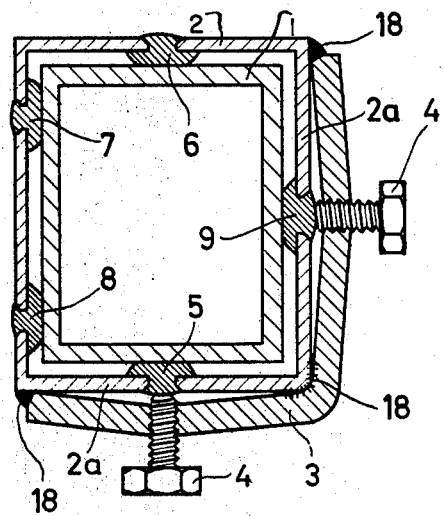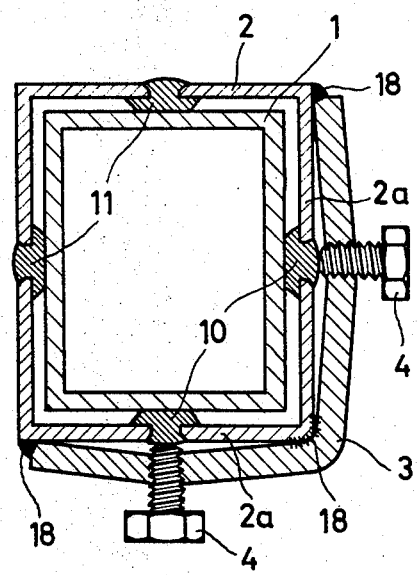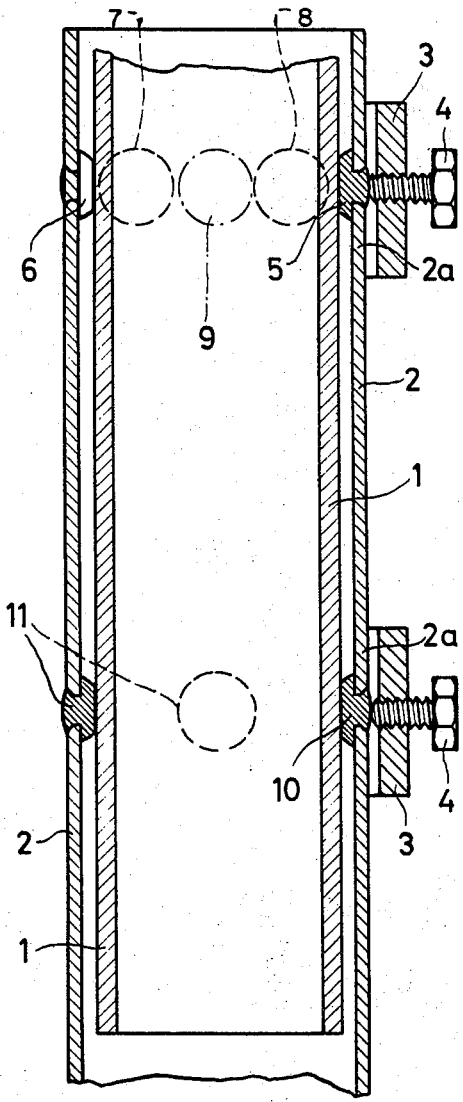
FIG. 2
FIG. 3
FIG. 1
INVENTOR.
ALOIS LÖDIGE

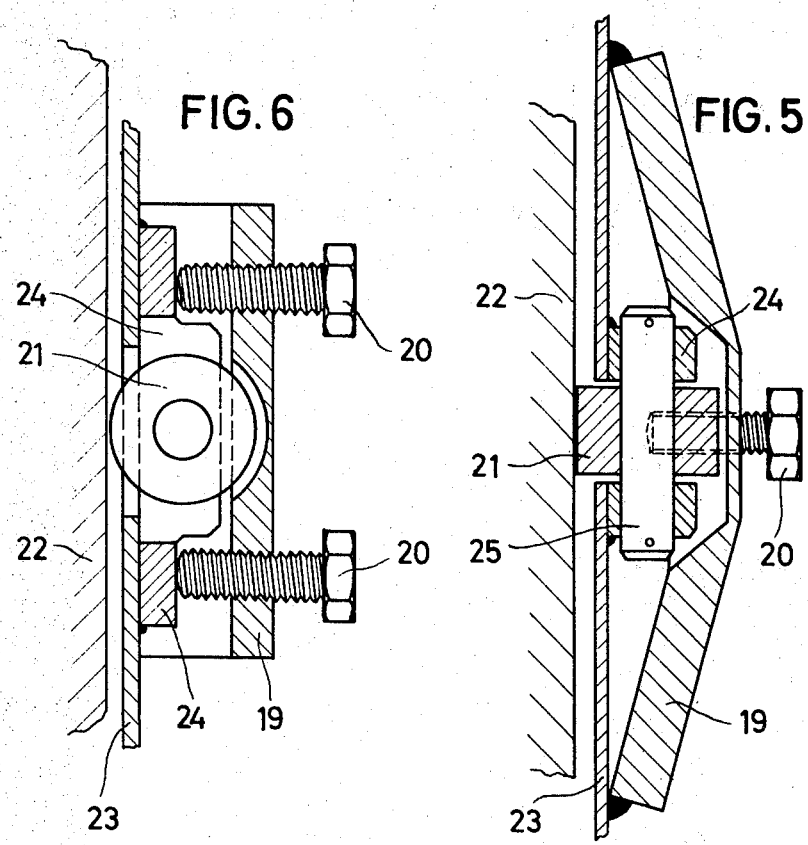

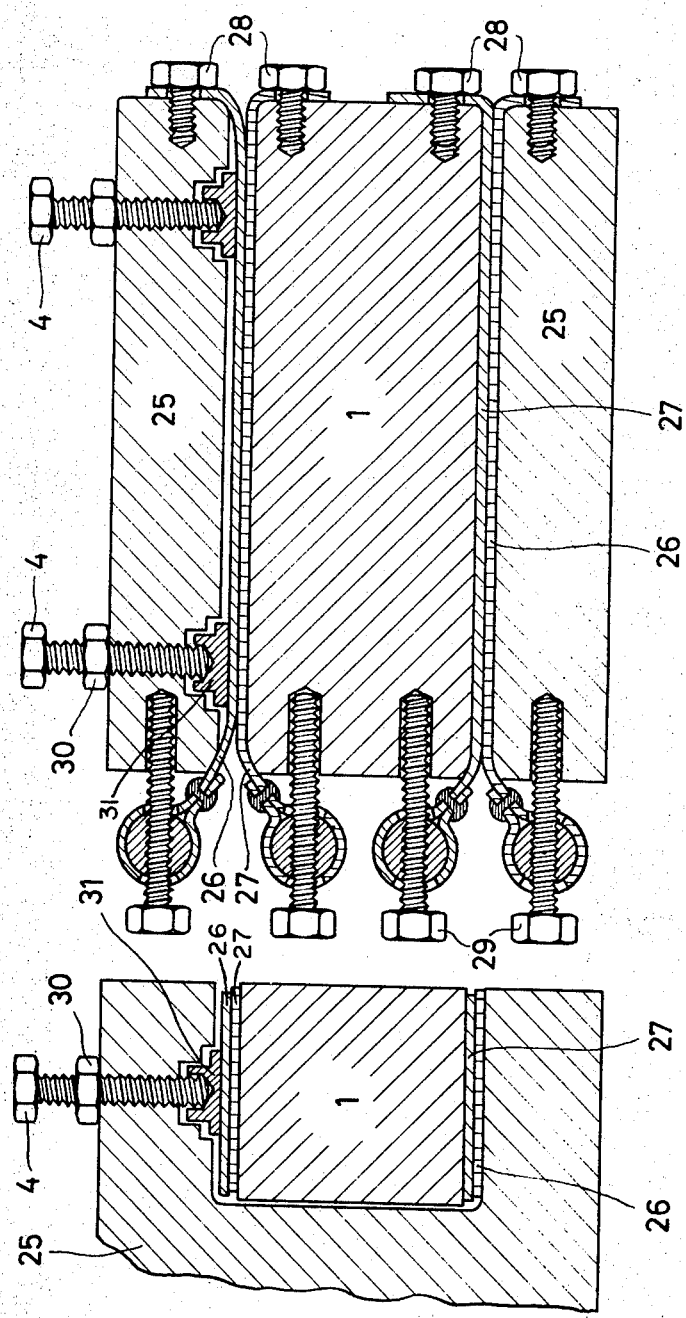

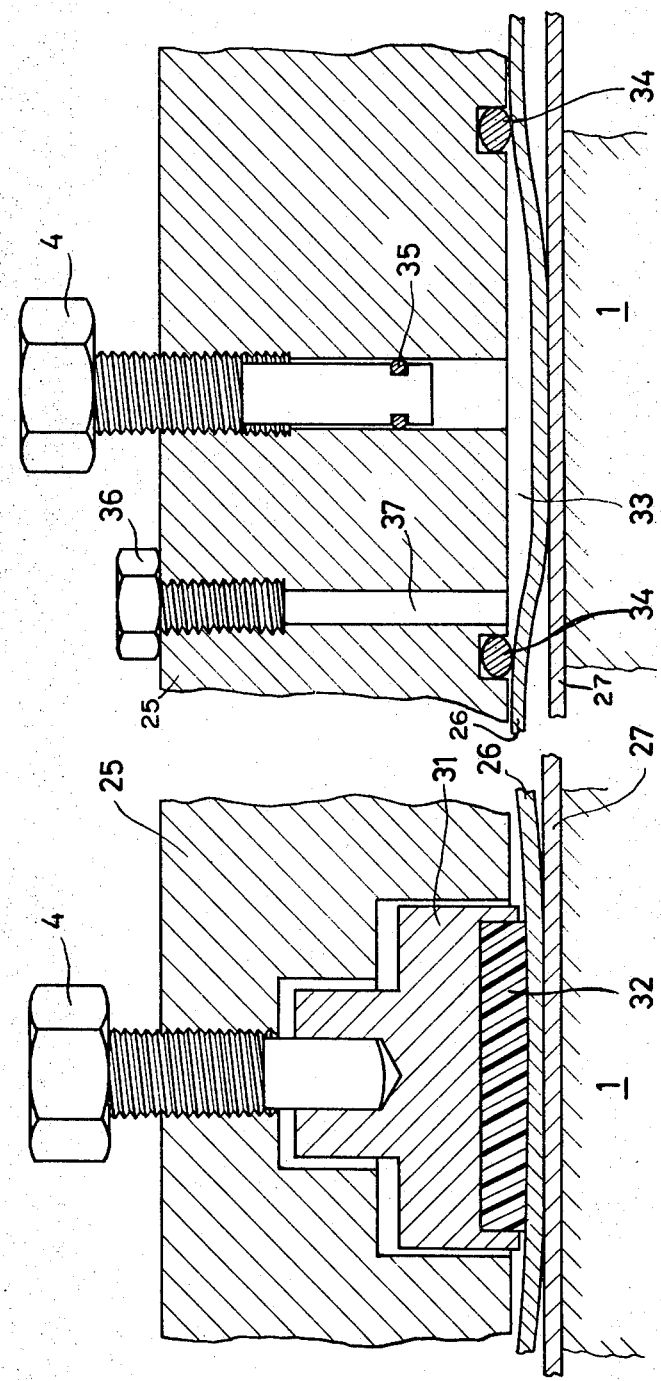

3,537,762
GUIDE SYSTEM WITH PRECISION ADJUSTMENT FOR TELESCOPIC COMPONENTS
Alois Lödige, 13 Frankfurter Weg, 479 Paderborn, Germany
Filed May 13, 1968, Ser. No. 728,548
Claims priority, application Germany, May 26, 1967, 1,575,542
Int. Cl. F16c *23/02*
U.S. Cl. 308—3          11 Claims

ABSTRACT OF THE DISCLOSURE

In an apparatus including a pair of longitudinally slideable telescopic components a guide system for guiding each component in the other comprising a plurality of guide members such as mushroom-headed slides, rollers or strips carried by a flexible diaphragm formed by or secured to one of the components so that the guide members engage the other component. At least some of the guide members are contacted by adjustment members such as screws engaging a support member to resist the forces normal to the longitudinal direction of the components. The support member may be formed by the component or by a separate rigid yoke secured to the outside of the component.

---

The invention relates to a guide system with precision adjustment, for components moving longitudinally telescopically alongside or within each other, and especially hollow bodies, such as are used for widely varying purposes in technology, as, for example, in the case of height-adjustable tables, X-ray apparatus, drilling machines, cutting-up saws, radial booms, in presses and the like, or to guides of the type used, for instance, in vises.

It is notoriously difficult and complicated to make two components, intended to slide telescopically alongside or within each other, with such precision and yet with such easy motion that the moving member is properly guided, without longitudinal or rotary play.

The present invention provides a guide system comprising a first component guided for longitudinal sliding movements by a plurality of guide members each carried by a flexible diaphragm, at least some of the guide members engaging adjustment members carried by relatively rigid supports secured to the diaphragms the adjustment members and supports serving to receive forces normal to the longitudinal direction of the component, whereby the first component telescopically mates with a second component forming one of the supports and diaphragms. The first of the components is precision-machined to produce parallel generated faces, while the second component is machined very approximately to size. The guide members may be mushroom-shaped adaptors, or rollers, fitted in or rigidly attached to the more crudely shaped mating component, these guide members being made immovable in the direction of motion. Perpendicularly to the direction of motion, they are given adequate resilience adjustment by the provision of adjusting screws mounted in the support yoke behind the guide members.

The flexible diaphragm where the guide members are fixed is made large enough to give the maximum elastic excursion. In this connection, it is important for the yoke to be stiffer, in its elastic deformation, than the flexible diaphragm, which, in the case of a telescopic tube, may be the tube itself. For telescopic tubes in which guidance is given in two longitudinally spaced belts, only one belt is arranged to counteract rotary play, this being achieved by the provision of only one guide member in the middle of each of three sides, while two such members, spaced as widely apart as possible, are provided on the fourth side. Rotary play is thus counteracted by three-point (triangular) action. This upper belt not only counteracts rotary play, but, in conjunction with the second belt, prevents rocking without tension.

Rocking is countered in each direction by the adjustment of a centrally placed guide member.

This type of guide system has the advantage that any rotary distortion of the precision-machined component does not result in stiffness of action, because the rotary play is taken up only in one belt of the guide. Static coincidence such as to stiffen the action is not possible with this form of construction. The anti-rocking guides touch a circut that can be drawn in centrally, where considered point by point, no jamming can arise from slight twisting, because the change in sign value begins in the vicinity of 90° at 1/∞.

The guide members may also take the form of roller-action components of any desired type. The roller-action component, in that case, will be mounted firmly on the flexible diaphragm, which may consist either of a tube wall or of a piece of flat iron or sheet metal.

Guide members such as "mushrooms" or rollers can be dispensed with in cases where the face of one mating component rubs directly against the face of the other component. The face then constitutes not only the guide member, but also the flexible diaphragm. It transmits the normal forces arising from the guiding action, through adjusting members, to the rigid support.

Should the properties of the materials or the sliding quality of such a frictional combination not be good enough, one or both of the mating components may be faced with wear-resistant materials—strips of hardened spring steel, for instance. These wear resistant facings will then constitute the guide members and the diaphragms by which the normal forces are transmitted at the requisite points, through adjusting members, to the support formed by the second component.

The adjusting device may be a plain screw or one with a "mushroom" thrust member, or the power transmission may be effected by pressure fluids, pneumatically or hydraulically, for example.

Whatever kind of play be concerned, it is always a question of rigid support and adjustable guide members carried by flexible diaphragms.

FIG. 1 is a longitudinal section of two hollow telescopic components. The guide consists of one belt above and one below.

FIG. 2 is a horizontal section through the upper belt, swung upwards and turned clockwise through 90°.

FIG. 3 is a section through the lower belt, swung upwards and turned clockwise through 90°.

FIG. 4 shows an example of the same method for other types of play encountered in construction, operating on the same basic principle, for presses, punches, lifting machinery and the like.

FIG. 5 shows an example in which, instead of a sliding contact, an adjustable roller guide is fitted.

FIG. 6 is a cross-section of such a roller guide.

FIG. 7 shows an arrangement in which both the mating components are faced with spring steel to provide a sliding surface.

FIG. 8 is a cross-section of the arrangement shown in FIG. 7.

FIG. 9 shows one of the pressure "mushrooms" seen in FIGS. 7 and 8, which is provided with a plastics facing to increase the friction surface of the slide facing.

FIG. 10 shows an arrangement in which the normal forces are transmitted from the slide facing to the support by pneumatic or hydraulic pressure fluid.

In FIG. 1, a precision-machined component in the form of a rectangular sectioned tube is numbered 1. A more approximately machined longitudinally telescoping mating component, also tubular, is numbered 2. Tensioning support yokes welded to the outside of the tube 2 are numbered 3 and adjustment members in the form of screws are numbered 4. Guide members in the form of mushroom headed slides in the top belt are numbered 5, 6, 7, 8 and 9. In the bottom belt, the adjustable guide members are numbered 10 and the non-adjustable guide members are numbered 11.

The top belt in FIG. 1 prevents rotary play by virtue of the fact that the adjustable guide member 9 (see also FIG. 2) brings the precision-machined component 1 to bear against the guide members 7 and 8, thus providing three-point protection against rotation. The guide members 5 and 6 in the top belt (FIG. 2) serve merely to provide guidance without play for the inner component 1. The adjustable guide members 10 and the non-adjustable guide members 11 in FIG. 3 serve solely to provide longitudinal guidance free from play. They are not a guard against rotation. In this embodiment the parts 2a of the tube 2 within the supports 3, which are of more rigid material than the tube 2, formed flexible diaphragms carrying the guide members.

In FIG. 4, the guide shown is based on the same principle. It does not consist of hollow components, but the form of construction is similar.

The component 12, which carries out relative motion and is fixed to a base as an interchangeable chafing strip, corresponds to the component 1 in FIG. 1. The diaphragm 13 corresponds to the parts 2a in FIG. 1.

The component 14 which is rigid compared with diaphragm 13 corresponds to the support yokes 3 in FIG. 1. The guide members 15 correspond to the guide members 6 to 11 in FIGS. 1 to 3. The adjusting screws 16 correspond to the adjusting screws 4. The anchoring member 17 corresponds to the weld seams 18 in FIGS. 2 and 3 and in each case the connection of the diaphragm and support is spaced from the connection of the diaphragm and guide member to give sufficient play in the diaphragm.

In FIGS. 5 and 6, the yoke 19 corresponds to the support yoke 3 in FIGS. 1 to 3. The adjusting screws 20 correspond to the adjusting screws 4. Wedges, cams or other such means of leverage may be used in place of adjusting screws. The roller 21 corresponds to the guide members 5 to 11. The component 22 corresponds to the component 1. Diaphragm part 23 corresponds to the parts 2a. The spindle mounting 24 is rigidly fixed to the part 23, as both the roller spindle 25 and the roller 21 must be rigidly fixed to the part 23.

In the example illustrated in FIGS. 7 and 8, the components 1 and 25, which carry out motion in relation to each other, are provided with chafing strips, 26 and 27. These strips 26 and 27, made of spring steel strip, for example, are secured at one end by the screws 28 and at the other end they are tensioned and secured by the screws 29.

The play between the strips is regulated by means of the adjusting screws 4, which are fitted with locknuts, 30, and the pressure "mushrooms" 31. They transmit the forces normal to the longitudinal sliding direction from the chafing strip 26 to the support yoke 25. The strips thus form both guide members and diaphragms.

FIG. 9 shows how the pressure mushroom 31 transmits the forces normal to the strip 26 through a plastics facing, 32.

FIG. 10 illustrates how the forces normal to the strips are transmitted from the yoke 25 by a hydraulic or pneumatic pressure cushion, 33, to the chafing strip 26. The pressure space is sealed by the circular rings 34 and 35. The change of volume and hence the play adjustment is brought about by means of the screw 4. Venting or filling with pressure fluid takes place through the duct 37, which is sealed off by the screw 36. Here, the facings 26 are screwed or cemented to the yoke 25, as they are also in FIG. 7.

I claim:
1. A guide system for telescopic components comprising first and second components telescopically mounted for relatively longitudinal movement with respect to one another, a plurality of guide members slidably engaging said first component to guide relative longitudinal movement thereof, said guide members being carried by spaced wall portions of said second component and being fixed against inward or outward movement with respect thereto, said wall portions defining flexible diaphragms, a relatively rigid support yoke fixedly connected with said second component and including portions spaced outwardly of said second component to enable elastic deformation of the adjacent diaphragms, adjustment means carried by said rigid support yoke and moveable inwardly and outwardly with respect thereto and engaging at least some of said guide members whereby said adjustment members and said support portions receive forces normal to the direction of longitudinal movement of said first component with respect to said second component, said adjusting means being moveable toward and away from said first component to vary the magnitude of guiding forces applied to said first component by said guide members.

2. A guide system according to claim 1 in which the guide members are arranged in at least two belts located at spaced intervals along the length of the components.

3. A guide system according to claim 2 in which in one only of the guide belts are the guide members arranged to prevent relative rotation of the components.

4. A guide system according to claim 3 in which one of the components is tubular and of substantially rectangular section and receives the other component and in which one guide member is located to engage the centre of one wall of the first component and two guide members are spaced to engage the sides of the opposite wall of that first component.

5. A guide system according to claim 4 in which the other guide members contact the centres of the walls of the first component.

6. A guide system according to claim 1 in which said relatively rigid support yoke is formed by a separate yoke secured at the outside of the second component around a perimeter spaced from the associated guide member.

7. A guide system according to claim 6 in which each component is tubular and the surface of the first component is accurately machined.

8. A guide system according to claim 1 in which the relatively rigid support yoke is formed by the second component and the flexible diaphragms are formed by at least one separate strip carrying the guide members and secured to the second component at a position spaced from the guide members.

9. A guide system according to claim 1 in which the guide members and flexible diaphragm are formed by interchangeable wear-resistant chafing strips secured to the second component and the relatively rigid support yoke comprises the second component which carries adjustment members engaging the strips.

10. A guide system according to claim 1 in which the adjustment members comprise screws directly engaging the guide members.

11. Apparatus as defined in claim 1 wherein each of said components includes a tubular portion of substantially rectangular cross section, said first component being slidably received within said second component, each relatively rigid support portion being formed by a separate yoke secured at the outside of the second component around a perimeter spaced from the associated guide member, said adjustment members comprising screws directly engaging said guide members, said guide members being arranged in at least two belts located at spaced intervals along the length of said second component, the guide members in only one said belts being arranged to prevent relative rotation of said components, the guide members in said one guide belt including a guide member engaging the center of one wall of said first component and including a pair of guide members engaging the opposite wall of said first component and being spaced widely apart.

References Cited

UNITED STATES PATENTS

| | | | |
|---|---|---|---|
| 2,342,946 | 2/1944 | LeTourneau | 308—3 |
| 3,212,827 | 10/1965 | Brettrager | 308—3 |
| 3,393,459 | 7/1968 | Lanahan | 308—6 X |
| 2,525,712 | 10/1950 | Neighbour. | |
| 2,854,078 | 9/1958 | Conner. | |
| 2,858,172 | 10/1958 | Schlapp. | |
| 3,097,892 | 7/1963 | Newbury | 308—6 |
| 3,338,642 | 8/1967 | Ortelli | 308—3 |
| 3,353,875 | 11/1967 | Karge | 308—6 |

FOREIGN PATENTS

| | | |
|---|---|---|
| 1,266,350 | 12/1961 | France. |
| 1,346,191 | 12/1963 | France. |
| 1,374,258 | 12/1964 | France. |
| 1,059,642 | 3/1954 | France. |
| 556,101 | 8/1932 | Germany. |
| 853,684 | 10/1952 | Germany. |
| 600,960 | 9/1945 | Great Britain. |

MANUEL A. ANTONAKAS, Primary Examiner